United States Patent [19]
Blazejak et al.

[11] Patent Number: 4,897,482
[45] Date of Patent: Jan. 30, 1990

[54] PROCESS FOR THE PREPARATION OF OLIGOMERIC 2,2,4-TRIMETHYL-1,2-DIHYDROQUINOLINE

[75] Inventors: Manfred Blazejak, Duesseldorf; Karl J. Wemmje, Burscheid; Heinz Hammer, Bergisch Gladbach, all of Fed. Rep. of Germany

[73] Assignee: Bayer Aktiengesellschaft, Leverkusen, Fed. Rep. of Germany

[21] Appl. No.: 359,198

[22] Filed: May 31, 1989

[30] Foreign Application Priority Data

Jun. 10, 1988 [DE] Fed. Rep. of Germany ....... 3819776

[51] Int. Cl.$^4$ ............................................ C07D 401/02
[52] U.S. Cl. .................................................. 546/181
[58] Field of Search ......................................... 546/181

[56] References Cited

U.S. PATENT DOCUMENTS

| | | | |
|---|---|---|---|
| 2,514,648 | 7/1950 | Rehe et al. | 546/181 |
| 3,047,521 | 7/1962 | Harman | 546/181 |
| 3,244,683 | 5/1966 | Kline | 546/181 |

*Primary Examiner*—David B. Springer
*Attorney, Agent, or Firm*—Sprung, Horn, Kramer & Woods

[57] ABSTRACT

Oligomeric 2,2,4-trimethyl-1,2-dihydroquinoline (TMQ) is prepared from monomeric TMQ by heating the latter in the presence of a polybasic aliphatic carboxylic acid and in the presence of small amounts of water.

10 Claims, No Drawings

PROCESS FOR THE PREPARATION OF OLIGOMERIC 2,2,4-TRIMETHYL-1,2-DIHYDROQUINOLINE

The present invention relates to a process for the preparation of oligomeric 2,2,4-trimethyl-1,2-dihydroquinoline (=oligomeric TMQ) from monomeric 2,2,4-trimethyl-1,2-dihydroquinoline (=monomeric TMQ) by heating in the presence of an acid.

Oligomeric TMQ is an important antioxidant for rubber, JP-OS No. 145,854/1978 stating that products having a high dimer content are distinguished by an improved action.

DE-OS (German Published Specification No.) 3,028,322 discloses to prepare oligomeric TMQ having a high dimer content using hydrochloric acid as catalyst, it being necessary for the concentration of hydrochloric acid in the reaction mixture to be 15 to 25% by weight. It is disadvantageous in this process that a large amount of hydrochloric acid must be used and that this hydrochloric acid must be removed again from the product in neutralization and washing processes. The process is inconvenient and also causes particular expense during processing of the waste water.

A process has now been found for the preparation of oligomeric 2,2,4-trimethyl-1,2-dihydroquinoline from monomeric 2,2,4-trimethyl-1,2-dihydroquinoline which is characterized in that monomeric 2,2,4-trimethyl-1,2-dihydroquinoline is heated in the presence of a polybasic aliphatic carboxylic acid and in the presence of small amounts of water.

In the process according to the invention, crude or purified monomeric 2,2,4-trimethyl-1,2-dihydroquinoline (=monomeric TMQ) which has been prepared in any desired manner can be employed. For example monomeric TMQ in crude form or which has optionally been purified by distillation and has been obtained in a known manner by reacting aniline with acetone, diacetone alcohol or mesityl oxide is suitable (see, for example, JP-OS (Japanese Published Specification) No. 40,661/1980).

It is preferred to employ in the process according to the invention monomeric TMQ which has a TMQ content of greater than 50% by weight, particularly preferably greater than 80% by weight, in particular greater than 90% by weight. Other components which may be present in the monomeric TMQ employed are, for example, aniline and/or compounds which are isomeric with monomeric TMQ.

A particular embodiment of the process according to the invention comprises employing monomeric TMQ which has been obtained by reacting aniline with acetone in toluene as solvent and with addition of p-toluenesulphonic acid as catalyst at bottom temperatures of from 110° to 150° C., in which process aniline, toluene and the catalyst are initially introduced, the mixture is heated to refluxing of the toluene, acetone introduction is then commenced, the water of reaction forming after commencement of the reaction—detectable from the elimination of water—is removed by distillation as an azeotropic mixture with toluene, and further addition of acetone is continued at the rate at which it is consumed.

An essential feature of the present invention is the use of a polybasic aliphatic carboxylic acid as catalyst. Suitable catalysts are, for example, those of the formula (I)

$$HOOC-(-CR_1R_2-)_n-COOH \qquad (I)$$

in which
R$_1$ represents hydrogen or OH,
R$_2$ represents hydrogen or COOH and
n represents an integer of from 0 to 4.

If several —(—CR$_1$R$_2$—)—groups occur in the formula (I) (n>1), these may be identical to or different from one another. If, for example, two such groups are present, they can be, for example, two CH$_2$ groups, one CH$_2$ and one H—C—OH group, or one CH$_2$ and one HO—C—COOH group.

Preferred catalysts are oxalic acid, maleic acid, succinic acid, tartaric acid and citric acid. Oxalic acid is particularly preferred. Mixtures of two or more polybasic aliphatic carboxylic acids can also be employed as catalyst.

The polybasic aliphatic carboxylic acids can also be unsaturated acids, for example fumaric acid.

Based on the monomeric TMQ employed, the catalyst to be used according to the invention can be employed, for example, in amounts of from 0.01 to 10% by weight. This amount is preferably 0.1 to 5% by weight.

The process according to the invention is carried out in the presence of small amounts of water. Water can be introduced into the reaction mixture, for example, in the form of water of crystallization along with the polybasic aliphatic carboxylic acid to be employed, but it can alternatively be added, if appropriate additionally, as such to the reaction mixture. Water can be present, for example, in amounts by weight of from 0.1 to 3 times the amount of polybasic aliphatic carboxylic acid employed. This amount is preferably 0.5 to 2.5 times.

The process according to the invention can be carried out, for example, at temperatures in the range from 80° to 180° C. Temperatures in the range from 100° to 150° C. are preferred. In general, the process according to the invention is carried out at atmospheric pressure. However, it is also possible to carry out the process at reduced or increased pressure, for example at 10 mbar to 5 bar. The process according to the invention can be carried out batchwise (for example in a stirred reactor) or continuously, for example in a tubular reactor. The reaction according to the invention is normally complete after a reaction time of from 1 to 20 hours, relatively large amounts of polybasic aliphatic carboxylic acids generally causing relatively short reaction times.

When the oligomerization reaction is complete, the reaction mixture can be worked up, for example, by removing unreacted monomeric TMQ by distillation at pressures in the range from 1000 to 1 mbar and bottom temperatures of up to 220° C. During this operation, the catalyst employed decomposes to compounds which are gaseous under the distillation conditions (for example CO$_2$, CO and H$_2$O). Oligomeric TMQ, which is free from interfering components and contains more than 50% by weight, frequently more than 60% by weight, of dimeric TMQ then remains. The monomeric TMQ removed by distillation can be recycled into the preparation of oligomeric TMQ.

After the preparation according to the invention of oligomeric TMQ, the latter can also be isolated from the reaction mixture by adding an aromatic solvent, for example toluene or xylene, and water, separating off the organic phase after vigorous mixing, and removing the aromatic solvent and monomeric TMQ directly in vacuo from the organic phase to give oligomeric TMQ as the residue.

In a particularly preferred embodiment of the process according to the invention, the following procedure is used: monomeric TMQ is mixed with a total of 0.5 to 5% by weight of anhydrous oxalic, maleic, succinic, tartaric and/or citric acid in the presence of 0.8 to 2 times the amount by weight of water (based on the acid employed), and the mixture is refluxed for 4 to 12 hours with stirring. Unreacted monomeric TMQ is then removed by distillation at a pressure of from 200 to 1 mbar and bottom temperatures of up to 220° C. and collected. At the same time, the decomposition products formed from the catalyst employed and gaseous under the distillation conditions are removed from the reaction mixture. The distillation residue remaining is particularly suitable, if appropriate after filtration and packaging, as an antioxidant for rubber.

The process according to the invention has a number of advantages. It gives oligomeric TMQ containing large proportions of dimeric TMQ. Oligomeric TMQ of this type is particularly suitable for use as an antioxidant for rubber. In addition, smaller amounts of catalyst can be employed in the process according to the invention than hitherto, it being possible to remove the catalysts to be used according to the invention in a simple manner after the process has been carried out, without neutralization and/or washing operations. Any traces of the catalyst employed which remain in the oligomeric TMQ do not impair the utility of the oligomeric TMQ. Compared with the process of DE-OS (German Published Specification) No. 3,028,322, purer products are obtained using the process according to the invention. It is extremely surprising that such good results can be achieved using the process according to the invention since polybasic aliphatic carboxylic acids are considerably weaker acids than the hydrochloric acid used hitherto, and since a dependency of the yield of oligomeric TMQ on the water content of the reaction mixture was hitherto not known.

EXAMPLES

EXAMPLE 1

130 parts by weight of aniline, 50 parts by weight of toluene and 2 parts by weight of p-toluenesulphonic acid were introduced into a stirred flask fitted with distillation attachment and water separator, and the batch was heated to refluxing of the toluene. 160 parts by weight of acetone were then added slowly, while the water of reaction produced was simultaneously removed together with the boiling toluene and separated off via the water separator. When the addition of the acetone was complete, stirring was continued until no further water was separated off.

Firstly, unreacted acetone and toluene and then, in vacuo, unreacted aniline and monomeric TMQ formed were removed by distillation. A small amount of a resinous residue which also contained p-toluenesulphonic acid remained.

The acetone, toluene and aniline removed by distillation and the resinous residue were re-employed in the next batch. The yield of monomeric TMQ was 73.0% of theory, based on the aniline employed.

100 parts by weight of the monomeric TMQ obtained in this way were mixed with 2 parts by weight of anhydrous oxalic acid and 2 parts by weight of water in a stirred flask fitted with distillation attachment, and the mixture was refluxed for 6 hours at 120° C. with stirring.

Unreacted monomeric TMQ was then removed by distillation at a pressure of 5 mbar up to a bottom temperature of 220° C., the oxalic acid decomposing virtually completely into $CO_2$, CO and water. These substances were removed in gas form by means of the vacuum.

The resinous residue remaining in the flask comprised oligomeric TMQ. The yield of oligomeric TMQ was 55.8% of theory, based on the monomeric TMQ employed. The monomeric TMQ removed by distillation was re-employed in the next batch.

The oligomeric TMQ obtained in this way had a dimeric TMQ content of 58.6% by weight. It proved to be significantly purer than oligomeric TMQ prepared in accordance with DE-OS (German Published Specification) No. 3,028,322. The HPLC spectrum of the oligomeric TMQs prepared in accordance with DE-OS (German Published Specification) No. 3,028,322 contained significantly more numerous and intense bands than the HPLC spectrum of the oligomeric TMQs obtained in accordance with the present example.

EXAMPLE 2

The procedure was as in Example 1, but 100 parts by weight of monomeric TMQ were employed together with 5 parts by weight of citric acid and 5 parts by weight of water, and the mixture was refluxed at 120° C. for 12 hours. After work-up, 52.3 parts by weight of a particularly pure oligomeric TMQ were obtained.

EXAMPLE 3

(for comparison - without water)

The procedure was as in Example 1, but without addition of water. After work-up, the yield of oligomeric TMQ was 20.6 parts by weight.

EXAMPLE 4

(for comparison - with a large amount of water)

The procedure was as in Example 1, but 10 parts by weight of water were employed. After work-up, the yield of oligomeric TMQ was 25.8 parts by weight.

EXAMPLE 5

100 parts by weight of the monomeric TMQ obtained in accordance with Example 1 were mixed with 6 parts by weight of oxalic acid containing water of crystallization and 3 parts by weight of water in a stirred flask fitted with distillation attachment, and the mixture was refluxed at 120°–140° C. for 6 hours with stirring.

The batch was then mixed with 150 parts by weight of toluene and washed twice with 50 parts by weight of water.

The organic phase - containing toluene, monomeric and oligomeric TMQ - was then heated in vacuo in a stripper, and toluene and monomeric TMQ were removed from the residue. This residue comprised oligomeric TMQ. The yield was 64.8%, based on monomeric TMQ employed.

EXAMPLE 6

The procedure was as in Example 5, but, as solvent, xylene, water and additionally 1 part by weight of sodium carbonate were added to the batch after the oligomerization. The mixture was stirred, the aqueous phase was separated off after settling, and the organic phase was washed with water and worked up as described in Example 5.

The yield of oligomeric TMQ was 59.6% of theory, based on monomeric TMQ employed.

We claim:

1. Process for the preparation of oligomeric 2,2,4-trimethyl-1,2-dihydroquinoline from monomeric 2,2,4-trimethyl-1,2-dihydroquinoline, characterized in that monomeric 2,2,4-trimethyl-1,2-dihydroquinoline is heated in the presence of a polybasic aliphatic carboxylic acid and in the presence of small amounts of water.

2. Process according to claim 1, characterized in that monomeric 2,2,4-trimethyl-1,2-dihydroquinoline is employed which has been obtained by reacting aniline with acetone in toluene as solvent and with addition of p-toluenesulphonic acid as catalyst at bottom temperatures of from 110° to 150° C., in which process aniline, toluene and the catalyst are initially introduced, the mixture is heated to refluxing of the toluene, acetone introduction is then commenced, the water of reaction forming after commencement of the reaction is removed by distillation as an azeotropic mixture with toluene, and the addition of acetone is continued at the rate at which it is consumed.

3. Process according to claim 1 and 2, characterized in that the polybasic aliphatic carboxylic acid employed conforms to the formula (I)

$$HOOC-(-CR_1R_2-)_n-COOH \quad (I)$$

in which
R$_1$ represents hydrogen or OH,
R$_2$ represents hydrogen or COOH and
n represents an integer of from 0 to 4.

4. Process according to claims 1 and 2, characterized in that an unsaturated polybasic aliphatic carboxylic acid is employed.

5. Process according to claim 1 characterized in that the polybasic aliphatic carboxylic acid is oxalic acid, maleic acid, succinic acid, tartaric acid, citric acid or fumaric acid.

6. Process according to claim 1 characterized in that 0.01 to 10% by weight, based on the monomeric 2,2,4-trimethyl-1,2-dihydroquinoline employed, of polybasic aliphatic carboxylic acid are employed.

7. Process according to claim 1 characterized in that water is employed in amounts by weight of from 0.1 to 3 times the amount of polybasic aliphatic carboxylic acid employed.

8. Process according to claim 1 characterized in that the mixture is heated' to temperatures in the range from 80° to 180° C.

9. Process according to claim 1 characterized in that the reaction mixture present after the reaction is worked up by removing unreacted monomeric 2,2,4-trimethyl-1,2-dihydroquinoline by distillation at a pressure in the range from 1000 to 1 mbar and at bottom temperatures of up to 220° C.

10. Process according to claim 1 characterized in that the reaction mixture present after the reaction is worked up by adding to it an aromatic solvent and water, separating off the organic phase after vigorous mixing, and removing therefrom the aromatic solvent and monomeric 2,2,4-trimethyl-1,2-dihydroquinoline in vacuo.

* * * * *